United States Patent
Ghafghaichi

[15] 3,668,522
[45] June 6, 1972

[54] METHOD AND APPARATUS FOR CHARACTERIZING TEST ELEMENTS ON THE BASIS OF RISE-TIME DEGRADATION

[72] Inventor: Majid Ghafghaichi, Beacon, N.Y.
[73] Assignee: International Business Machines Corporation, Armonk, N.Y.
[22] Filed: Dec. 9, 1968
[21] Appl. No.: 782,299

[52] U.S. Cl. ......................... 324/158 T, 324/58 B, 324/158 D
[51] Int. Cl. ..................................... G01r 31/22, G01r 27/04
[58] Field of Search ............................. 324/158, 158 T, 58 B

[56] References Cited

UNITED STATES PATENTS

| | | | |
|---|---|---|---|
| 2,532,736 | 12/1950 | Sheppard | 324/58 |
| 3,423,677 | 1/1969 | Alford et al | 324/158 |
| 3,500,204 | 3/1970 | Stromer | 324/158 |

OTHER PUBLICATIONS

Electronics, " Testing Microwave Transmission Lines" (H. Halverson), June 30, 1961, pages 86– 88.
I.E.E. Paper No. 3019E " Measurement of Transistor Characteristics at Very High Frequencies" (J. H. Bagley), Mar. 1960, pages 945– 50.

Primary Examiner—Rudolph V. Rolinec
Assistant Examiner—Ernest F. Karlsen
Attorney—Hanifin and Jancin and Theodore E. Galanthay

[57] ABSTRACT

Method and apparatus for characterizing the dynamic input impedance of a test element by measuring the rise-time degradation of an input waveform. A pulse having a very fast rise-time is supplied by a pulse generator and transmitted down two branches of a balanced transmission line. One leg of the balanced transmission line is connected to a sensing means while the other leg of the balanced transmission line is connected to a test element as well as the sensing means. Thus, the sensing means would receive two identical pulses but for the rise-time degradation of the pulse connected to the test element. The test element is characterized on the basis of this rise-time degradation.

1 Claims, 4 Drawing Figures

INVENTOR
MAJID GHAFGHAICHI

BY Theodore E. Galanthay
AGENT

3,668,522

METHOD AND APPARATUS FOR CHARACTERIZING TEST ELEMENTS ON THE BASIS OF RISE-TIME DEGRADATION

BACKGROUND OF THE INVENTION

This invention relates to a method of measuring the dynamic impedance of a test element. More specifically, this invention relates to determining the input impedance of an electronic component, such as a transistor, by measuring the effects on the input waveform. The waveforms used simulate those actually used under operating conditions.

DESCRIPTION OF THE PRIOR ART

There are a number of well-known methods for measuring the impedance of an electronic component. Generally speaking, these techniques break down into pulse measurements and frequency measurements.

A typical frequency measuring technique involves the simultaneous application of a sinusoidal waveform of a known frequency to a test element and a variable reference element. The value of the reference element is varied until the response of the two elements to the sinusoidal waveform is identical. A reading of the value of the reference element provides an indication of the input impedance of the test element. An inherent disadvantage of this technique is that the test waveform is frequently different from actual operating conditions, for which the component is to be used.

A well-known pulse measuring technique consists of sending a fast rise time pulse down a transmission line having a known impedance. The test element is connected at the termination of the transmission line. Due to the discontinuity provided by the test element, a waveform is reflected back up the transmission line, the shape and amplitude of said reflected waveform being an indication of the impedance of the test element. This technique introduces inaccuracies because the reflected waveform cannot be measured at the test element.

Both the foregoing techniques lack speed and accuracy, particularly in the measurement of very small values of capacitance. Both the foregoing techniques rely on the measurement of voltage differences. In the frequency measurement technique, the reference element is varied until it matches the voltage response of the test element. In the pulse measuring technique, the amplitude of the voltage response as a function of time is an indication of the impedance of the test element. Neither of these techniques permits measurement of the time delay of an input pulse, caused by the input impedance of the test element. Furthermore, there is no known means for automating either of these prior art techniques for mass production, and thereby sorting elements by automatically detecting the input impedance.

SUMMARY OF THE INVENTION

It is therefore an object of this invention to accurately measure the dynamic impedance of a test element, at the test element.

It is another object of this invention to measure the time delay of an input pulse caused by the input impedance of a test element.

It is a further object of this invention to measure the effect of the test element on a circuit under waveform conditions simulating actual operating conditions.

Lastly, it is an object of this invention to sort elements by automatically detecting the input impedance.

In accordance with my invention, a pulse generator supplies a pulse having a very fast rise time in the order of 1 – 1.5 nanoseconds. This pulse is transmitted down two branches of a balanced transmission line. The termination of one leg of the balanced transmission line is connected to a sensing means. The end of the other leg of the balanced transmission line is connected to the sensing means as well as a test element. Thus, the sensing means would receive two identical pulses but for the rise time degradation of the pulse connected to the test element. In this way, the time delay occasioned by the test element is measured by the sensing means, and displayed digitally. The digital information displayed is in turn applied to a digital computer for rapidly sorting test elements. Thus, the dynamic impedance of a test element is determined by automatically comparing a reference waveform with a waveform measured at the test element.

The foregoing and other objects, features and advantages will be apparent from the following more particular description of the preferred method of my invention, as illustrated in the accompanying drawings.

BRIEF DESCRIPTION OF THE DRAWINGS

FIG. 2 (b) represents the reference waveform superimposed over the waveform from the test element.

DESCRIPTION OF THE PREFERRED EMBODIMENTS

Figure 1:
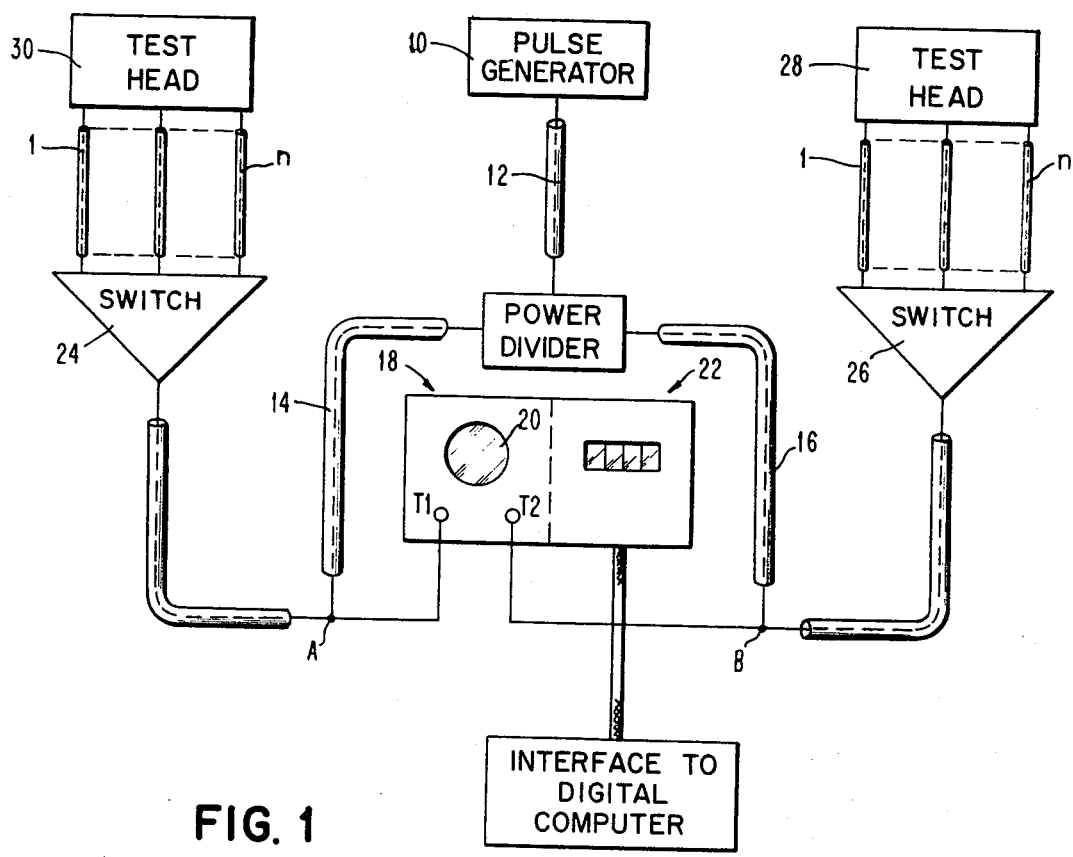
FIG. 1 is a test apparatus for practicing the method of my invention.

Refer now to FIG. 1 which shows the preferred embodiment of the apparatus used to practice my method. Any well-known pulse generator providing a pulse with a very fast rise time can be used. The output of pulse generator 10 is connected to transmission line 12, which in turn is connected to transmission lines 14 and 16. Transmission line 14 is connected to sensing means 18 through terminal T1 and transmission line 16 is connected to the sensing means through terminal T2. Transmission line 16 is also connected to the test element. Sensing means 18 can be any apparatus which will measure the difference in time between an input at T1 and at T2. The measurement can be digitally read out by display unit 22. An apparatus which can be used to perform the sensing operation is a Tektronix* (*Trademark of the Tektronix Corporation) type 567 oscilloscope. A digital readout type 6 RIA manufactured by the same corporation can be used to perform the digital readout. The waveforms are displayed on the face of CRT 20. The digital readout can be connected through a suitable interface to a digital computer for automatic sorting of the test elements.

With continued reference to FIG. 1, note programmable switches 24 and 26 connected to transmission line 14 and 16 respectively. These switches are used if a more sophisticated test operation is desired. Electronic components to be tested are plugged into test head 28 which is connected to programmable co-axial switch 26. In this way, a large number of components are tested very rapidly. Test head 30 is connected to programmable co-axial switch 24, but no test elements are plugged into test head 30. By this technique, any difference in waveform at terminals T1 and T2 will be caused solely by the effect of the electronic component under test, which is plugged into test head 28. The input capacitance of a transistor, which is non-linear, is measured by the method of my invention by simply changing the externally applied biasing conditions. Typical values are shown for transmission lines 12, 14, and 16 but these are merely examples for purposes of illustration. For example, all three transmission lines could have an impedance of 50 ohms. The choice can be varied widely depending on the availability of the particular transmission lines. The only critical requirement is that transmission lines 14 and 16 have the same characteristic impedance.

Figure 2A:
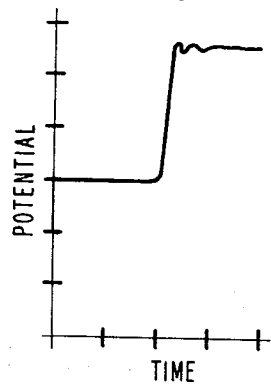
FIG. 2 (a) represents the reference waveform.
Figure 2B:
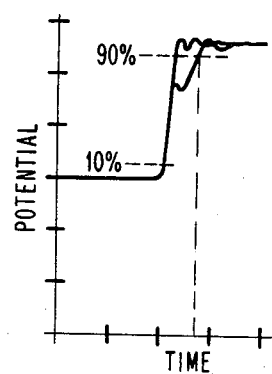

Refer now to FIG. 2 (a) which shows the waveform at reference node A in the circuit of FIG. 1. With continued reference to FIG. 2 (a), FIG. 2 (b) shows the waveforms at reference node A and test node B superimposed. These are the waveforms impressed on terminals T1 and T2 of sensing means 18, and are thereby displayed on the face of CRT 20.

In operation, pulse generator 10 provides a fast rise time pulse similar to the one shown in FIG. 2 (a). This pulse passes down transmission line 12 and by power splitting by power divider 15 also passes through transmission lines 14 and 16. Transmission line 14 has no load attached thereto and the pulse will pass to terminal T1 virtually unchanged. With no test element attached at node B, the pulse arriving at T2 will be identical to the one at T1, as represented in FIG. 2 (a). Therefore, the two pulses will be in perfect super-imposition and readout device 22 will display a "0" reading. The attachment of test head 30 through switch 24 to node A and the attachment of test head 28 through switch 26 to node B will have a relatively negligible effect on the waveform of FIG. 2 (a). At any rate, the effect will be identical and CRT 20 will still show the signals at T1 and T2 perfectly superimposed. The readout of course, will still be "0." However, the attachment of a test element to test head 28 will cause the rise time of the signal at terminal T2 to be degraded as shown in FIG. (b). In FIG. 2 (b) note that the waveform at node A has remained unchanged whereas the rise time of the waveform at node B has been degraded. Sensing means 18 can provide a reading of the difference in time between the two waveforms at any point in their amplitude. For purposes of classical rise time measurements, the 10 and 90 percent amplitude levels have been selected. Accordingly, digital readout device 22 provides the time difference between the waveform at node A and the waveform at node B at 90 percent of their amplitudes. This is a measure of the actual effect of the electronic component in the operation of a circuit. A digital computer can use this information to accept or reject the particular electronic component under test.

As an alternative, it is possible to attach a reference element to reference node A when the test element is attached to node B. The resultant test provides an indication of the difference of the input impedance of the two elements. In the usual situation, however, node A is connected only to test head 30 through switch 24.

Figure 3:
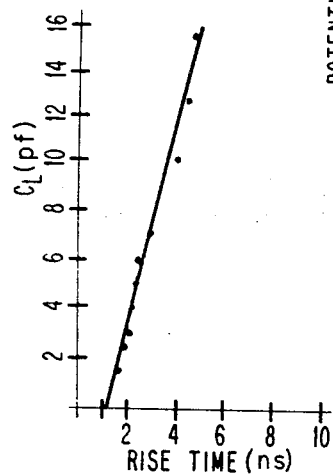
FIG. 3 is a chart useful in determining actual values of capacitance from waveform measurements.

The waveform in FIG. 2 (b) indicates that the component under test has an input capacitance resulting in a degradation of the rise time of the waveform at node B. The degree of degradation is indicative of the actual value of capacitance. Therefore, by measuring the delay "$d$" at the 90 percent amplitude level, caused by a number of electronic components with known values of capacitance, a chart such as the one in FIG. 3 can be constructed. Once a chart such as the one in FIG. 3 has been obtained for a particular test system, the time delay occasioned by a particular test element can always be correlated to a specific value of capacitance. Specific values of capacitance, however, frequently need not be obtained. It is much more important to know the amount of delay to be expected from the input capacitance of a particular electronic component. In the example of FIG. 3, the reference waveform has a rise time of about 1.2 nanoseconds and subsequent points are plotted on the basis of delay "$d$." It should be noted that the rise time is dependent only on the availability of pulse generators and improved pulse generators with faster rise time pulses will result in even more accurate measurements.

The method as described herein, therefore involves the generation of a fast rise time pulse by means of pulse generator 10. This waveform is delivered to test node B and reference node A via transmission lines 16 and 14 respectively. The test elements can then be connected directly to test node B, or, in the alternative, convenient test fixtures (of identical design) can be attached to both nodes A and B. The resultant waveforms at node A and node B are simultaneously compared by sensing means 18. The time delay is measured as described above and is digitally displayed by readout 22. The test elements can then be characterized in accordance with the time delay caused. The characterization can be by a digital computer which in turn can operate known apparatus for sorting the test elements in accordance with their characteristics.

In conclusion, a method has been described for determining the dynamic impedance of a test element quickly and accurately. It has been pointed out how the method readily lends itself to automation. The particular example discussed relates to a test element with an input capacitance, such as the base of a transistor. Those skilled in the art will readily recognize that the method is equally applicable to test elements with inductive characteristics.

Therefore, while the invention has been particularly shown and described with reference to a preferred embodiment, it will be understood by those skilled in the art that various changes in form and detail may be made therein without departing from the spirit and scope of the invention.

I claim:

1. In a system for determining the dynamic input impedance of a rectifying semiconductor junction by measuring the rise time degradation of an input pulse comprising the steps of: connecting said semiconductor at a test node, delivering reference fast rise time pulses by way of a first transmission line to said test node, simultaneously delivering said reference pulses by way of a second and identical transmission line to a reference node, sensing the pulse signal at said reference node, said reference node pulse signal being substantially identical to the reference pulse, simultaneously sensing the pulse signal at said test node, said pulse signal at the test node being different from said reference pulse due to rise time degradation caused by said semiconductor connected at said test node whereby the pulse signal at the test node is a composite signal of incident and delayed reflected pulse wave components, comparing the pulse signals at the reference and test nodes to determine delay in the composite incident and reflected component pulse signal at the test node as a result of rise time degradation caused by said semiconductor junction, and characterizing the semiconductor under test on the basis of its dynamic input impedance as indicated by the delay.

* * * * *